(No Model.)

S. D. SHAFER.
Wagon End Gate.

No. 234,149.  Patented Nov. 9, 1880.

Witnesses:  
Franck L. Ouraud  
H. Aubrey Toulmin

Inventor:  
Samuel D. Shafer  
By Alexander Toulmin  
Atty

UNITED STATES PATENT OFFICE.

SAMUEL D. SHAFER, OF MEXICO, MISSOURI.

WAGON END-GATE.

SPECIFICATION forming part of Letters Patent No. 234,149, dated November 9, 1880.

Application filed April 5, 1880. (No model.)

*To all whom it may concern:*

Be it known that I, SAMUEL D. SHAFER, of Mexico, in the county of Audrain, and in the State of Missouri, have invented certain new and useful Improvements in Wagon End-Gates; and I do hereby declare that the following is a full, clear, and exact description thereof, reference being had to the accompanying drawings, and to the letters of reference marked thereon, making a part of this specification.

The nature of my invention consists in the construction and arrangement of an end-gate for wagons, as will be hereinafter more fully set forth.

In order to enable others skilled in the art to which my invention appertains to make and use the same, I will now proceed to describe its construction and operation, referring to the annexed drawings, of which—

Figure 1:
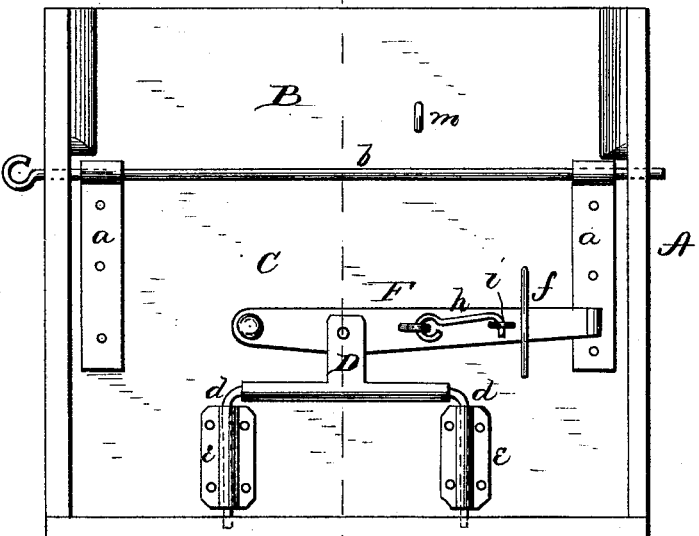
Figure 2:
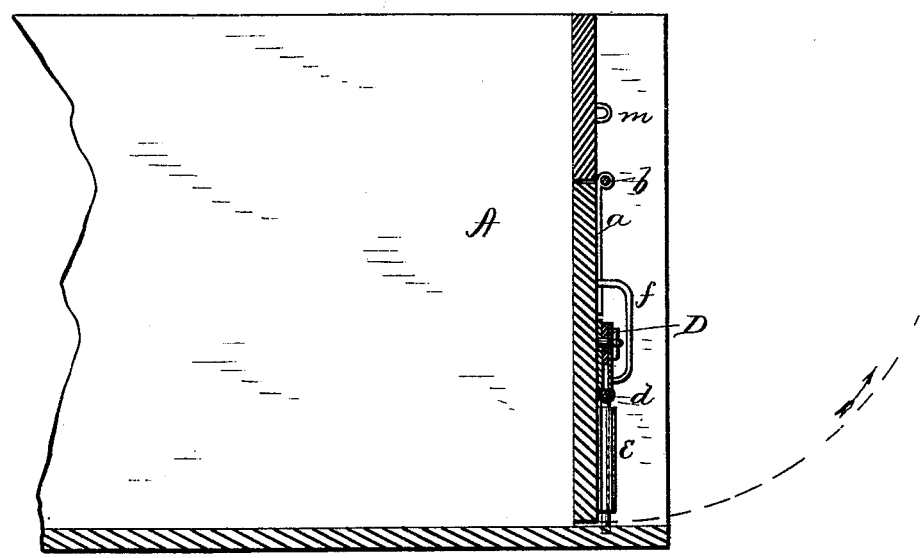

Figure 1 is a rear view of a wagon-box with my end-gate applied thereto. Fig. 2 is a vertical section thereof.

A represents an ordinary wagon-box of any suitable construction. At the rear end the box A is provided with a top cross-bar, B, and immediately at the lower edge thereof is hinged the gate C by means of strap-hinges $a\, a$, attached to the gate and passing around a rod, $b$, which is passed through the sides of the body, as shown.

When the gate is closed it is held or fastened by two bolts, $d$, passing through vertical guides $e$ and down into holes or recesses in the bottom of the body. The two bolts $d\, d$ are preferably made in one piece, and a T-shaped strap, D, bent around the center, and connecting the same with a lever, F, pivoted at one end to the gate. The other end of the lever passes under a vertical elongated staple, $f$, and when the bolts are lowered the lever fits over a small staple, $i$, and is locked by a hook, $h$.

By raising the hook $h$ and springing the lever off from the staple $i$ the lever can be raised as far as the staple $f$ will permit, which removes the bolts, and the gate can then be swung upward, and may be held in an elevated position by means of the hook $h$ taking into a staple, $m$, on the cross-bar B.

This end-gate may be applied to any wagon, and is cheap, simple, and durable, and not liable to get out of order.

The gate may be entirely removed by simply pulling out the rod $b$.

Having thus fully described my invention, what I claim as new, and desire to secure by Letters Patent, is—

In an end-gate for wagons, the bar B, in combination with the gate C, hung by strap-hinges $a$ to the rod $b$, and provided with the bolts $d$, strap D, lever F, staples $f\, i$, and hook $h$, substantially as and for the purposes herein set forth.

In testimony that I claim the foregoing I have hereunto set my hand this 29th day of March, 1880.

SAMUEL D. SHAFER.

Witnesses:
 JOHN R. BRAGG,
 W. V. TELFAIR.